(12) United States Patent
Miyata

(10) Patent No.: US 8,867,656 B2
(45) Date of Patent: Oct. 21, 2014

(54) COMMUNICATION APPARATUS AND COMMUNICATION METHOD

(75) Inventor: Takeo Miyata, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/982,190

(22) PCT Filed: Dec. 14, 2011

(86) PCT No.: PCT/JP2011/078944
§ 371 (c)(1),
(2), (4) Date: Jul. 26, 2013

(87) PCT Pub. No.: WO2012/101921
PCT Pub. Date: Aug. 2, 2012

(65) Prior Publication Data
US 2013/0308723 A1    Nov. 21, 2013

(30) Foreign Application Priority Data
Jan. 27, 2011    (JP) ................. 2011-015805

(51) Int. Cl.
*H04L 27/00*    (2006.01)
*H04B 7/06*    (2006.01)
(Continued)

(52) U.S. Cl.
CPC ............ *H04B 7/0686* (2013.01); *H04L 1/0026* (2013.01); *H04L 5/006* (2013.01);
(Continued)

(58) Field of Classification Search
CPC ... H04L 5/0023; H04L 1/0009; H04L 1/0026;
H04L 1/0003; H04L 1/0618; H04L 25/03343;
H04L 25/0204; H04L 1/0625; H04L 1/06;
H04L 2025/03426; H04L 5/006; H04L
1/0002; H04L 27/2626; H04L 1/0025; H04L
27/261; H04L 1/1887; H04L 25/0228; H04L
1/0031; H04L 1/1867; H04L 1/0041; H04L
2025/0342; H04L 27/2675; H04L 1/0058;
H04L 1/02; H04L 27/0012; H04L 27/2627;
H04L 5/0005; H04L 5/0016; H04L 1/0668;
H04L 5/0046; H04L 27/0008; H04B 7/0689;
H04B 7/0669; H04B 7/0697
USPC ........... 375/295, 260, 261, 264, 268, 22, 267,
375/298, 299, 279, 300, 347, 349;
455/67.13, 500, 115.1, 517, 226.2,
455/115.2, 115.3, 17, 226.3, 101, 103;
370/334, 465, 312, 437, 432
See application file for complete search history.

(56) References Cited

U.S. PATENT DOCUMENTS 8,345,637 B2 *    1/2013    Heath et al. .................... 370/332
8,755,452 B2 *    6/2014    Levy .............................. 375/267
(Continued)

FOREIGN PATENT DOCUMENTS

JP    2005-094255 A    4/2005
JP    2006-135674 A    5/2006
(Continued)

OTHER PUBLICATIONS

International Search Report dated Jan. 31, 2012, issued for International Application No. PCT/JP2011/078944.

(Continued)

*Primary Examiner* — Rahel Guarino
(74) *Attorney, Agent, or Firm* — Procopio, Cory, Hargreaves & Savitch LLP

(57) ABSTRACT

When a determination is made that communication by an SM scheme is suitable, a setting unit performs switching from a communication level by an STC scheme to the communication level by the SM scheme, between the communication level at a first level of MCS by the space-time coding scheme and the communication level at a second level of MCS by the SM scheme. When a determination is made that communication by the SM scheme is unsuitable, the setting unit performs switching from the communication level by the STC scheme to the communication level by the spatial multiplexing scheme, between the communication level at a third level of MCS, which is higher than the first level, by the space-time coding scheme and a fourth level of the modulation scheme and the coding rate, which is higher than the second level, by the SM scheme.

12 Claims, 15 Drawing Sheets

(51) Int. Cl.
  *H04L 1/00* (2006.01)
  *H04L 5/00* (2006.01)
  *H04L 1/06* (2006.01)
  *H04W 36/14* (2009.01)
  *H04W 88/08* (2009.01)

(52) U.S. Cl.
  CPC ............ *H04L 1/0618* (2013.01); *H04L 1/0668* (2013.01); *H04L 1/0025* (2013.01); *H04B 7/0678* (2013.01); *H04B 7/0697* (2013.01); *H04L 1/0003* (2013.01); *H04L 1/0009* (2013.01); *H04L 1/0625* (2013.01); *H04W 36/14* (2013.01); *H04W 88/08* (2013.01); *H04L 27/0008* (2013.01); *H04B 7/0669* (2013.01); *H04B 7/0689* (2013.01); *H04L 5/0023* (2013.01); *H04L 5/0046* (2013.01)
  USPC ............ 375/295; 375/260; 375/261; 375/264; 375/268; 375/267; 375/298; 375/299; 375/279; 375/300; 375/347; 375/349; 455/101; 455/103; 455/67.13; 455/500; 455/115.1; 455/517; 455/226.2; 455/115.2; 455/226.3; 370/334; 370/465; 370/312; 370/437; 370/432

(56) References Cited

U.S. PATENT DOCUMENTS

| | | |
|---|---|---|
| 2005/0276317 A1 | 12/2005 | Jeong et al. |
| 2006/0109931 A1 | 5/2006 | Asai et al. |
| 2010/0046445 A1 | 2/2010 | Sawahashi et al. |
| 2010/0080320 A1 | 4/2010 | Yano et al. |
| 2012/0294176 A1 | 11/2012 | Miyata |
| 2013/0070735 A1 | 3/2013 | Miyata |

FOREIGN PATENT DOCUMENTS

| | | |
|---|---|---|
| JP | 2008-503144 A | 1/2008 |
| JP | 2009-055413 A | 3/2009 |
| JP | 2009-273186 A | 11/2009 |
| JP | 2010-087730 A | 4/2010 |
| JP | 2011-147002 A | 7/2011 |
| JP | 2011-250186 A | 12/2011 |

OTHER PUBLICATIONS

Office Action dated May 20, 2014 issued for counterpart Japanese patent application No. JP2011-015805A.

\* cited by examiner

| MCS | THROUGHPUT (bit/symbol) | |
| --- | --- | --- |
| | STC SCHEME | SM (REDUNDANCY) SCHEME |
| QPSK 1/2 | 1 | 2 UNUSED |
| QPSK 3/4 | 1.5 | 3 |
| 16QAM 1/2 | 2 | 4 |
| 16QAM 3/4 | 3 | 6 |
| 64QAM 2/3 | UNUSED 4 | 8 |
| 64QAM 3/4 | 4.5 | 9 |
| 64QAM 5/6 | 5 | 10 |

(b)

| MCS | THROUGHPUT (bit/symbol) | |
| --- | --- | --- |
| | STC SCHEME | SM (REDUNDANCY) SCHEME |
| QPSK 1/2 | 1 | 2 UNUSED |
| QPSK 3/4 | 1.5 | 3 |
| 16QAM 1/2 | 2 | 4 |
| 16QAM 3/4 | 3 | 6 |
| 64QAM 2/3 | 4 | 8 |
| 64QAM 3/4 | UNUSED 4.5 | 9 |
| 64QAM 5/6 | 5 | 10 |

(c)

| MCS | THROUGHPUT (bit/symbol) | |
| --- | --- | --- |
| | STC SCHEME | SM (REDUNDANCY) SCHEME |
| QPSK 1/2 | 1 | 2 |
| QPSK 3/4 | 1.5 | 3 UNUSED |
| 16QAM 1/2 | 2 | 4 |
| 16QAM 3/4 | 3 | 6 |
| 64QAM 2/3 | 4 | 8 |
| 64QAM 3/4 | 4.5 | 9 |
| 64QAM 5/6 | 5 | 10 |

| COMMUNICATION LEVEL | MIMO | MCS | CINR |
|---|---|---|---|
| 1 | STC | QPSK 1/2 | $CINR < x1$ |
| 2 | STC | QPSK 3/4 | $x1 \leq CINR < x2$ |
| 3 | STC | 16QAM 1/2 | $x2 \leq CINR < x3$ |
| 4 | SM | QPSK 3/4 | $x3 \leq CINR < x4$ |
| 5 | SM | 16QAM 1/2 | $x4 \leq CINR < x5$ |
| 6 | SM | 16QAM 3/4 | $x5 \leq CINR < x6$ |
| 7 | SM | 64QAM 2/3 | $x6 \leq CINR < x7$ |
| 8 | SM | 64QAM 3/4 | $x7 \leq CINR < x8$ |
| 9 | SM | 64QAM 5/6 | $x8 \leq CINR$ |

(b)

| COMMUNICATION LEVEL | MIMO | MCS | CINR |
|---|---|---|---|
| 1 | STC | QPSK 1/2 | $CINR < y1$ |
| 2 | STC | QPSK 3/4 | $y1 \leq CINR < y2$ |
| 3 | STC | 16QAM 1/2 | $y2 \leq CINR < y3$ |
| 4 | STC | 16QAM 3/4 | $y3 \leq CINR < y4$ |
| 5 | SM | 16QAM 1/2 | $y4 \leq CINR < y5$ |
| 6 | SM | 16QAM 3/4 | $y5 \leq CINR < y6$ |
| 7 | SM | 64QAM 2/3 | $y6 \leq CINR < y7$ |
| 8 | SM | 64QAM 3/4 | $y7 \leq CINR < y8$ |
| 9 | SM | 64QAM 5/6 | $y8 \leq CINR$ |

(c)

| COMMUNICATION LEVEL | MIMO | MCS | CINR |
|---|---|---|---|
| 1 | STC | QPSK 1/2 | $CINR < z1$ |
| 2 | STC | QPSK 3/4 | $z1 \leq CINR < z2$ |
| 3 | STC | 16QAM 1/2 | $z2 \leq CINR < z3$ |
| 4 | STC | 16QAM 3/4 | $z3 \leq CINR < z4$ |
| 5 | STC | 64QAM 2/3 | $z4 \leq CINR < z5$ |
| 6 | STC | 64QAM 3/4 | $z5 \leq CINR < z6$ |
| 7 | STC | 64QAM 5/6 | $z6 \leq CINR < z7$ |
| 8 | SM | 16QAM 3/4 | $z7 \leq CINR < z8$ |
| 9 | SM | 64QAM 2/3 | $z8 \leq CINR < z9$ |
| 10 | SM | 64QAM 3/4 | $z9 \leq CINR < z10$ |
| 11 | SM | 64QAM 5/6 | $z10 \leq CINR$ |

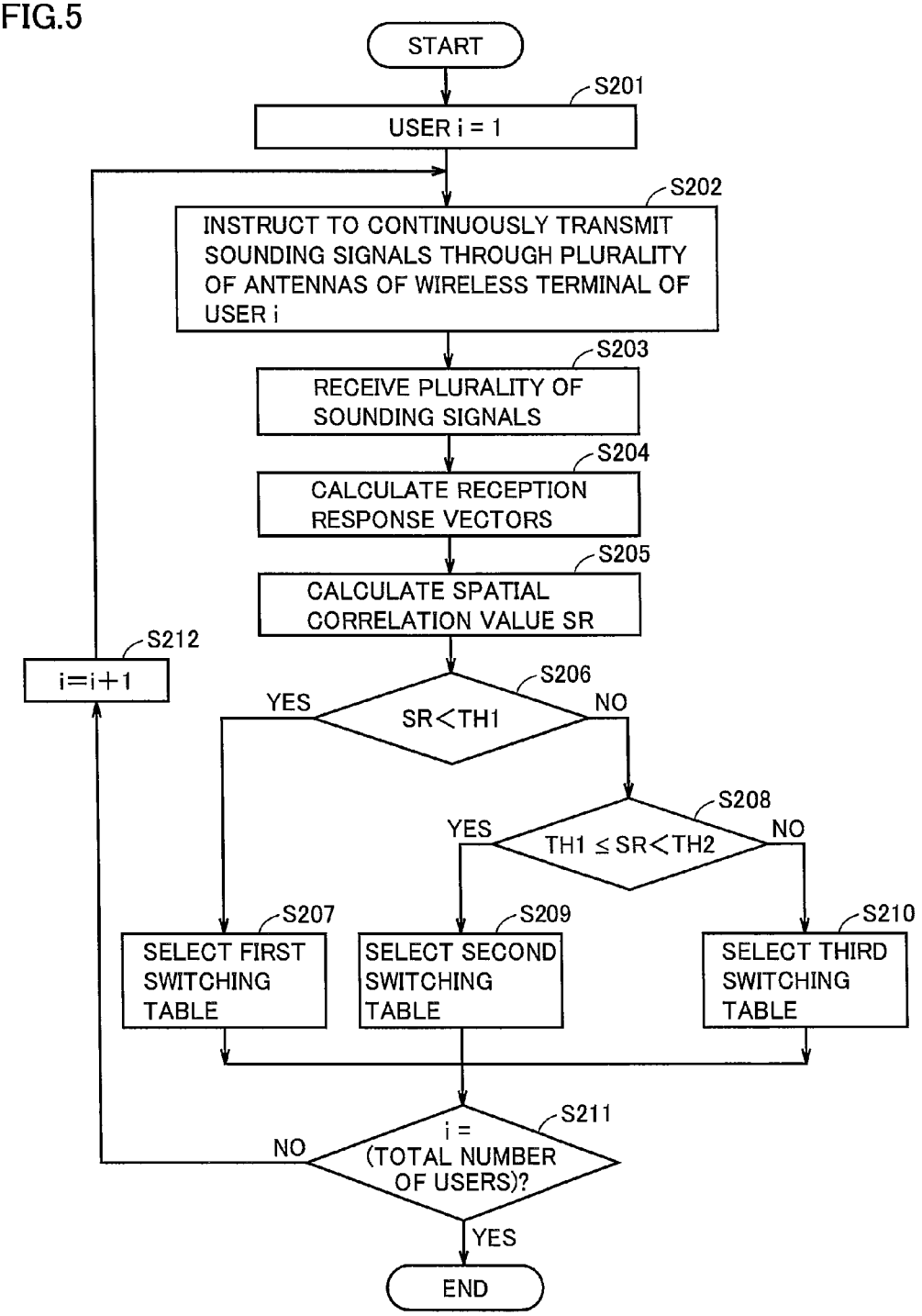

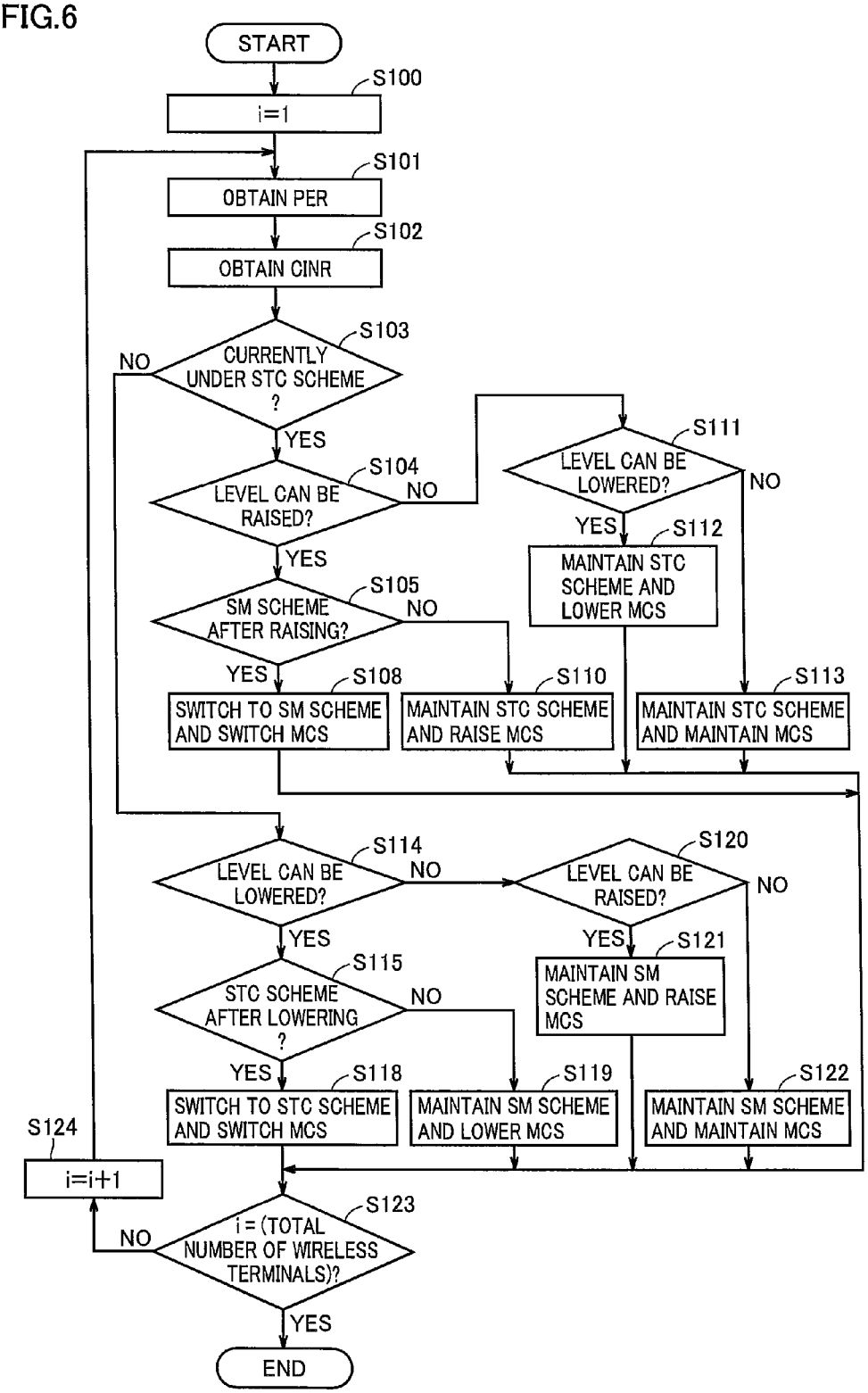

| CINR | TH1 | TH2 |
|------|-----|-----|
| 1 | x1 | y1 |
| 2 | x2 | y2 |
| 3 | x3 | y3 |
| ⋮ | ⋮ | ⋮ |

FIG.15

| THE NUMBER OF ANTENNAS | MAXIMUM VALUE OF DIFFERENCE IN GAIN BETWEEN ANTENNAS | SM ACHIEVEMENTS | SUITABILITY FOR SM |
|---|---|---|---|
| X1 OR MORE | Y1 [dB] OR LESS | 50% OR MORE | SUITABLE |
| X2 OR LESS | Y2 [dB] OR MORE | 20% OR LESS | UNSUITABLE |
| OTHER THAN ABOVE | | | NEUTRAL |

FIG.16

| OUTDOOR/ INDOOR | DISTANCE FROM NEAREST BASE STATION | NEAR ROAD OR WITHIN VEHICLE | SUITABILITY FOR SM |
|---|---|---|---|
| INDOOR | Y1 [km] OR MORE | NO | SUITABLE |
| OUTDOOR | Y2 [km] OR LESS | YES | UNSUITABLE |
| OTHER THAN ABOVE | | | NEUTRAL |

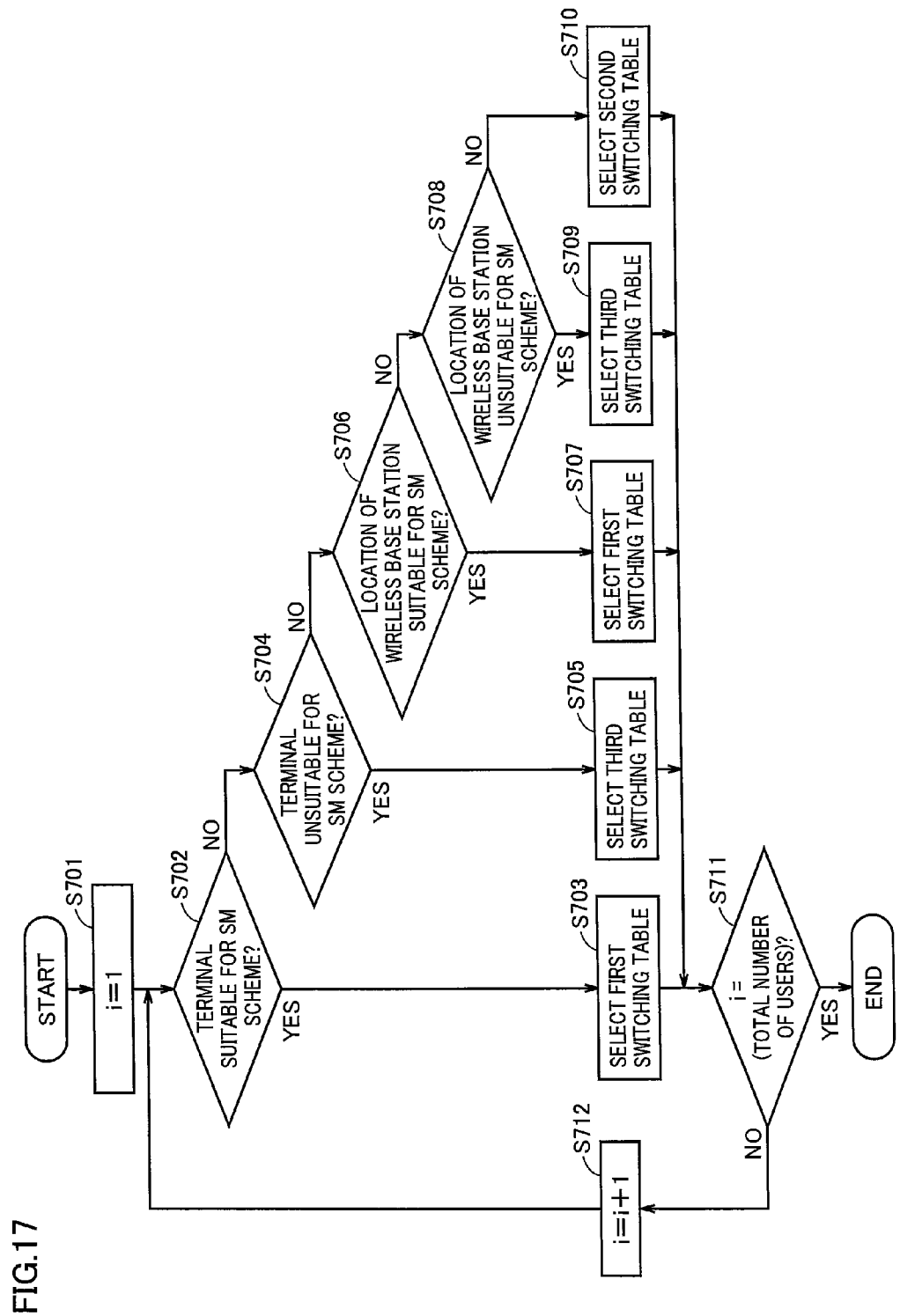

COMMUNICATION APPARATUS AND COMMUNICATION METHOD

TECHNICAL FIELD

The present invention relates to a communication apparatus and a communication method, and particularly to a communication apparatus capable of subjecting a transmission signal to spatial multiplexing and a communication method for such a communication apparatus.

BACKGROUND ART

In various wireless communication systems, such as WiMAX (Worldwide Interoperability for Microwave Access), next generation PHS (Personal Handy-Phone System), and LTE (Long Term Evolution), MIMO (Multiple Input Multiple Output) is used which is a communication technique through use of a plurality of antennas on both sides of a transmitting side and a receiving side aiming at improving throughput and frequency use efficiency.

The MIMO communication scheme includes an STC (Space-Time Coding) scheme and an SM (Spatial Multiplex) scheme (e.g., see Patent Document 1 (Japanese Patent Laying-Open No. 2009-273186)).

Under the STC scheme, a communication apparatus arranges (i.e., codes) one signal stream based on a certain rule in terms of time and space (antenna), and transmits a coded signal stream through a plurality of antennas. On the other hand, under the SM scheme, a communication apparatus multiplexes a plurality of signal streams at the same frequency through a plurality of antennas.

Switches are made in MCS (Modulation and Coding Scheme) and the MIMO scheme depending on wireless performance, such as error rate. Since communication by the SM scheme is likely to become unstable, a switch to the SM scheme is generally made with a margin.

That is, generally, a communication apparatus utilizes the STC scheme in the initial state, and increases the level of MCS as wireless performance becomes better. If the wireless performance becomes still better after arriving at MCS at which the maximum throughput can be obtained by the STC scheme, a switch is made to the SM scheme.

CITATION LIST

Patent Document

PTD 1: Japanese Patent Laying-Open No. 2009-273186

SUMMARY OF INVENTION

Technical Problem

Depending on the situation of a propagation path, such as environmental factors and arrangement of antennas, the performance by the SM scheme varies, and the optimum switching point between the SM scheme and the STC scheme is not constant but varies according to the circumstances. That is, by making a switch to the SM scheme at MCS at a level lower than the MCS at which the maximum throughput can be obtained by the STC scheme, frequency utilization efficiency may be increased.

It is therefore an object of the present invention to provide a communication apparatus and a communication method capable of switching the MIMO scheme at an optimum switching point depending on the situation of a propagation path.

Solution to Problem

In order to solve the above-mentioned problem, a communication apparatus according to the present invention includes a plurality of antennas, a modulation unit configured to modulate a transmission signal according to a set modulation scheme and coding rate, a coding unit configured to code the transmission signal according to the set modulation scheme and coding rate, a transmission unit configured to code a data stream of the transmission signal by a non-spatial multiplexing scheme when a set MIMO communication scheme is the non-spatial multiplexing scheme, and to subject a plurality of data streams of the transmission signal to spatial multiplexing when the set MIMO communication scheme is a spatial multiplexing scheme, a communication quality management unit configured to obtain communication quality of a signal received at another communication apparatus which is a communication partner, a determination unit configured to determine suitability of communication by the spatial multiplexing scheme to the other communication apparatus which is the communication partner, and a setting unit configured to increase a communication level defined by a modulation scheme, a coding rate and a MIMO communication scheme as the obtained communication quality is better. The communication level by the non-spatial multiplexing scheme is lower than the communication level by the spatial multiplexing scheme, and in each MIMO communication scheme. The communication level is higher as the level of the modulation scheme and the coding rate is higher. When switching the communication level from the non-spatial multiplexing scheme to the spatial multiplexing scheme, the setting unit changes the level of the modulation scheme and the coding rate before switching and the level of the modulation scheme and the coding rate after switching depending on suitability of communication by the spatial multiplexing scheme determined by the determination unit.

Advantageous Effects of Invention

According to the present invention, the MIMO scheme can be switched at an optimum switching point depending on the situation of a propagation path.

BRIEF DESCRIPTION OF DRAWINGS

FIG. 3 illustrates at (a) a switching point in a MIMO communication scheme when an SM scheme is suitable, illustrates at (b) a switching point in the MIMO communication scheme when the suitability/unsuitability of the SM scheme is neutral, and illustrates at (c) a switching point in the MIMO communication scheme when the SM scheme is unsuitable.

FIG. 4 represents at (a) an example of a first switching table, represents at (b) an example of a second switching table, and represents at (c) an example of a third switching table.

FIG. 5 is a flowchart showing a procedure of switching table selection processing in the wireless base station according to the first embodiment.

FIG. 6 is a flowchart showing a procedure of a switching operation for a communication level for a single frame in the wireless base station according to the first embodiment.

FIG. 15 represents an example of an SM suitability table for a wireless terminal.

FIG. 16 represents an example of an SM suitability table for the wireless base station.

FIG. 17 is a flowchart showing a procedure of switching table selection processing in the wireless base station according to the third embodiment.

DESCRIPTION OF EMBODIMENTS

Embodiments of the present invention will be described hereinafter with reference to the drawings.

First Embodiment

Figure 1:
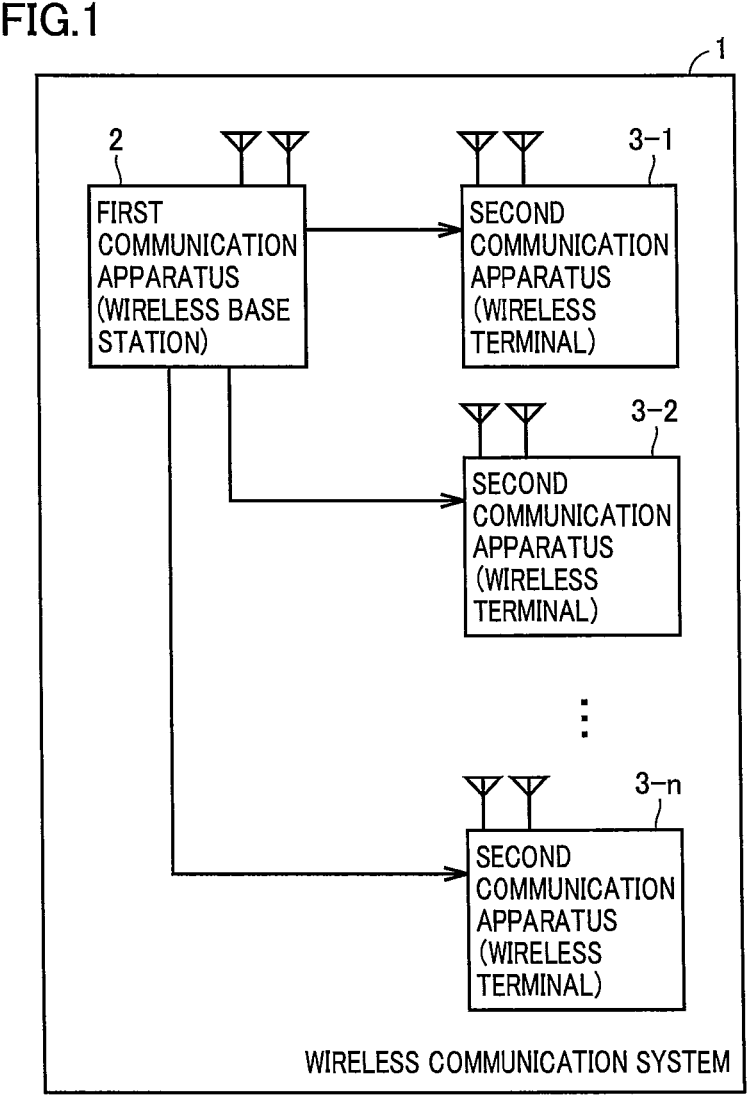
FIG. 1 represents a wireless communication scheme according to an embodiment of the present invention.

FIG. 1 represents a wireless communication system according to an embodiment of the present invention.

Referring to FIG. 1, this wireless communication system includes a first communication apparatus 2 and n second communication apparatus 3-1 to 3-n. A signal is transmitted between first communication apparatus 2 and n second communication apparatus 3-1 to 3-n by the space-time coding scheme or the spatial multiplex scheme. First communication apparatus 2 can be implemented by a wireless base station, for example. Second communication apparatus 3-1 to 3-n can be implemented by wireless terminals, for example. The wireless base station is capable of communicating simultaneously with two or more of n wireless terminals.

(Configuration)

Figure 2:
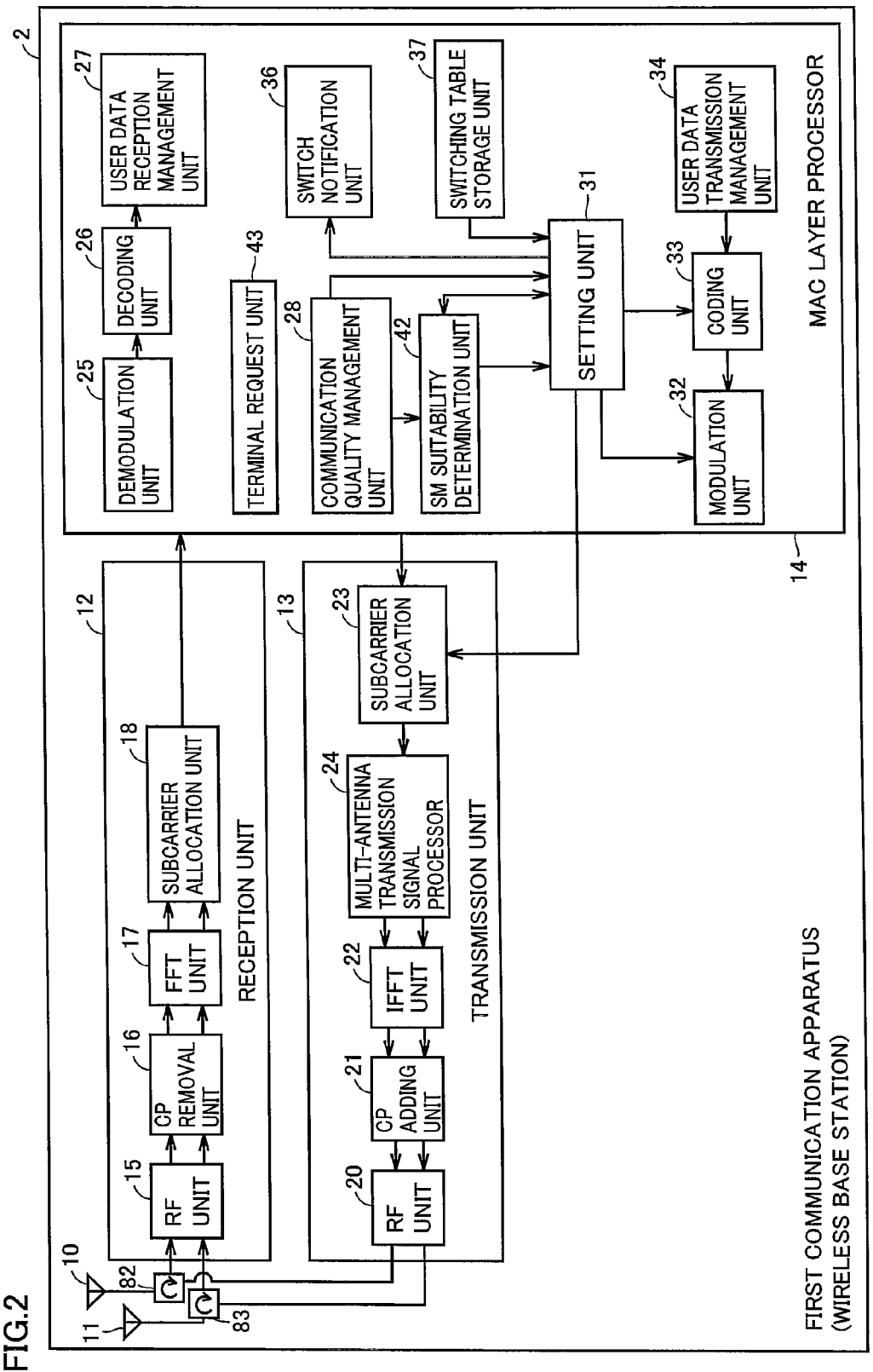
FIG. 2 represents a configuration of a wireless base station according to a first embodiment.

FIG. 2 represents a configuration of the wireless base station according to the first embodiment.

Referring to FIG. 2, this wireless base station is a base station that operates under the WiMAX communication scheme and includes a first antenna 10, a second antenna 11, a transmission unit 13, a reception unit 12, and an MAC (Media Access Control) layer processor 14.

Transmission unit 13 includes a multi-antenna transmission signal processor 24, a subcarrier allocation unit 23, an IFFT (Inverse First Fourier Transform) unit 22, a CP (Cyclic Prefix) adding unit 21, and an RF (Radio Frequency) unit 20.

Subcarrier allocation unit 23 allocates a subcarrier based on, for example, PUSC (Partial Usage of Subchannels).

Multi-antenna transmission signal processor 24 transmits a signal by a MIMO communication scheme which is a wireless communication scheme in which a plurality of antennas are combined to broaden the band of data transmission/reception.

Under the MIMO communication scheme used by multi-antenna transmission signal processor 24, the STC scheme and the SM scheme are switched selectively.

Multi-antenna transmission signal processor 24 subjects a data stream to time-space coding (e.g., Alamouti coding) by the STC scheme, and subjects a plurality of data streams to spatial multiplexing by the SM scheme.

IFFT unit 22 converts a plurality of subcarrier signals (signals in the frequency range) output from multi-antenna transmission signal processor 24 into a signal of the time region (OFDMA (Orthogonal Frequency Division Multiple Access) symbol) by IFFT.

CP adding unit 21 adds a signal equivalent to the tail of the OFDMA symbol to the head of the OFDMA symbol as the CP.

RF unit 20 includes an up converter for up-converting a radio frequency band, a power amplification circuit amplifying an up-converted signal, and a bandpass filter for passing only the signal component of a desired band among the amplified signals for output to first antenna 10 and second antenna 11.

Reception unit 12 includes an RF unit 15, a CP removal unit 16, a FFT (First Fourier Transform) unit 17, and a subcarrier allocation unit 18.

RF unit 15 includes a bandpass filter passing only the signal component of a desired band among signals output from first antenna 10 and second antenna 11, a low-noise amplification circuit amplifying an RF signal, a down converter for down-converting an RF signal, and the like.

CP removal unit 16 removes the CP from the signal output from RF unit 15.

FFT unit 17 converts the signal in the time region output from CP removal unit 16 into a signal in the frequency range by FFT for demodulation of a plurality of subcarriers.

Subcarrier allocation unit 18 extracts each subcarrier output from FFT unit 17 based on, for example, PUSC.

MAC layer processor 14 includes a demodulation unit 25, a decoding unit 26, a user data reception management unit 27, a terminal request unit 43, a communication quality management unit 28, an SM suitability determination unit 42, a switching table storage unit 37, a setting unit 31, a switch notification unit 36, a user data transmission management unit 34, a coding unit 33, and a modulation unit 32.

Demodulation unit 25 demodulates an uplink signal from a wireless terminal.

Decoding unit 26 decodes the demodulated uplink signal.

User data reception management unit 27 manages the user data received from the wireless terminal.

Communication quality management unit 28 periodically receives, from a wireless terminal which is a communication partner, PER (Packet Error Rate) of a signal received at that wireless terminal (i.e., a downlink signal), CINR (Carrier to Interference and Noise Ratio) of the downlink signal, or a notice of information that can replace them. PER indicates the ratio of packets with errors among received packets. CINR is expressed by a value obtained by dividing carrier power by the sum of interference signal power and noise power.

Terminal request unit 43 instructs a wireless terminal making communication to continuously transmit sounding signals through a plurality of antennas.

(Switching in MIMO Communication Scheme)

FIG. 3 illustrates at (a) a switching point in the MIMO communication scheme when the SM scheme is suitable.

In FIG. 3 at (a), MCS defines the modulation scheme (e.g., QPSK, 16QAM, 64AQAM) and the coding rate (e.g., ½, ⅔, ¾).

The present specification describes an MCS with high throughput as a high-level MCS, and an MCS with low throughput as a low-level MCS.

When the SM scheme is suitable, switching from the STC scheme to the SM scheme is performed at 16QAM ½ which is a point where the MCS level is relatively low. Assume that throughput at "STC, 16QAM ½" is 2 (bit/symbol), and that MCS by the SM scheme after switching is QPSK ¾ where throughput is 3 (bit/symbol) such that throughput does not change rapidly before and after switching.

FIG. 3 illustrates at (b) a switching point in the MIMO communication scheme when the suitability/unsuitability of the SM scheme is neutral.

When suitability/unsuitability of the SM scheme is neutral, switching from the STC scheme to the SM scheme is performed at 16QAM ¾ which is a point where the MCS level is relatively intermediate. Assume that throughput at "STC, 16QAM ¾" is 3 (bit/symbol), and that MCS by the SM scheme after switching is 16QAM ½ where throughput is 4 (bit/symbol) such that throughput does not change rapidly before and after switching.

FIG. 3 illustrates at (c) a switching point in the MIMO communication scheme when the SM scheme is unsuitable.

When the SM scheme is unsuitable, switching from the STC scheme to the SM scheme is performed at 64QAM ⅚ which is a point where the MCS level is relatively high. Assume that throughput at "STC, 64QAM ⅚" is 5 (bit/symbol), and that MCS by the SM scheme after switching is 16QAM ¾ where throughput is 6 (bit/symbol) such that throughput does not change rapidly before and after switching.

Switching table storage unit 37 stores a first switching table, a second switching table, and a third switching table.

Each switching table stores a communication level and a switching table defining the range of required CINR in increasing the communication level. In the present specification, the communication level is assumed to be a value determined by the MIMO communication scheme and MCS. In the present specification, increasing the communication level in value is expressed as "raising (increasing) the communication level", and decreasing the communication level in value is expressed as "lowering (decreasing) the communication level."

FIG. 4 represents at (a) an example of the first switching table.

The first switching table is a table in which the MIMO communication scheme is switched at a switching point when the propagation path is in good condition as described with reference to FIG. 3 at (a).

Referring to FIG. 4 at (a), for example, at the communication level "1", the MIMO communication scheme is the "STC scheme" and MCS is "QPSK ½." At the communication level "9", the MIMO communication scheme is the "SM scheme" and MCS is "64QAM ⅚." In this first switching table, for example, when the current communication level is "1", the communication level is switched to "2" if obtained CINR is more than or equal to x1 and less than x2.

FIG. 4 represents at (b) an example of the second switching table.

The second switching table is a table in which the MIMO communication scheme is switched at the switching point when the propagation path is in an intermediate situation as described with reference to FIG. 3 at (b).

FIG. 4 represents at (c) an example of the third switching table.

The third switching table is a table in which the MIMO communication scheme is switched at the switching point when the propagation path is in an inferior situation as described with reference to FIG. 3 at (c).

SM suitability determination unit 42 calculates a reception response vector of a sounding signal transmitted by a plurality of subcarriers (e.g., four consecutive subcarriers) in a sounding zone transmitted through one of antennas of a wireless terminal, and a reception response vector of a sounding signal transmitted by a plurality of subcarriers in a sounding zone through the other one of antennas of the wireless terminal.

A reception signal X1(t) in a plurality of subcarriers in the sounding zone received at first antenna 10 and a reception signal X2(t) in the plurality of subcarriers in the sounding zone received at second antenna 11 are represented by Equations (1) and (2) set forth below using a sounding signal S1(t) in the plurality of subcarriers in the sounding zone transmitted through an antenna (1) of a wireless terminal, a sounding signal S2(t) in the plurality of subcarriers in the sounding zone transmitted through an antenna (2) of the wireless terminal, a reception response vector H1 (=[h11, h21]$^T$) of the sounding signal through the antenna (1) of the wireless terminal, and a reception response vector H2 (=[h12, h22]$^T$) of the sounding signal through the antenna (2) of the wireless terminal.

$$X1(t)=h11\times S1(t)+h12\times S2(t)+N1(t) \tag{1}$$

$$X2(t)=h21\times S1(t)+h22\times S2(t)+N2(t) \tag{2}$$

where N1(t) is the noise component included in reception signal X1(t) received at first antenna 10, and N2(t) is the noise component included in reception signal X2(t) received at second antenna 11.

SM suitability determination unit 42 calculates, according to Equations (3) and (4) set forth below, reception response vector H1 and reception response vector H2.

$$H1=[h11,h21]^T=[E[X1(t)U1^*(t)],E[X2(t)U1^*(t)]]^T \tag{3}$$

$$H2=[h12,h22]^T=[E[X1(t)U2^*(t)],E[X2(t)U2^*(t)]]^T \tag{4}$$

where U1(t) is a signal identical to S1(t) held in a wireless base station 2, and U2(t) is a signal identical to S2(t) held in wireless base station 2. U1*(t) is the complex conjugate of U1(t), U2*(t) is the complex conjugate of U2(t), and E(X) represents the ensemble average (time average) of X. With respect to a vector A, A$^T$ represents a transposition of vector A.

SM suitability determination unit 42 calculates, according to Equation (5) set forth below, a spatial correlation value SR of a sounding signal transmitted through one of the antennas of a wireless terminal and a sounding signal transmitted from the other one of the antennas of the wireless terminal.

$$SR=|(H1\cdot H2)|/(|H1|\times|H2|) \tag{5}$$

If spatial correlation value SR is less than a threshold value TH1, SM suitability determination unit 42 determines that the SM scheme is suitable, and causes setting unit 31 to select the first switching table. If spatial correlation value SR is more than or equal to threshold value TH1 and less than a threshold value TH2, SM suitability determination unit 42 determines that the suitability/unsuitability of the SM scheme is neutral, and causes setting unit 31 to select the second switching table. If spatial correlation value SR is more than or equal to threshold TH2, SM suitability determination unit 42 determines that the SM scheme is unsuitable, and causes setting unit 31 to select the third switching table.

The reason for setting as described above will be described.

It is considered that a low spatial correlation value SR is due to different orientations of the antenna (1) of the wireless terminal and the antenna (2) of the wireless terminal or a long distance therebetween. For the wireless terminal having such antennas, communication by the SM scheme is suitable.

In contrast, it is considered that a high spatial correlation value SR is due to the same orientation of the antenna (1) of the wireless terminal and the antenna (2) of the wireless terminal or a short distance therebetween. For the wireless terminal having such antennas, communication by the SM scheme is unsuitable.

Setting unit 31 refers to the first switching table, the second switching table, or the third switching table having been selected, and if measured CINR is included in the range of required CINR at a communication level higher than the current communication level, raises the communication level such that CINR is included in the range of required CINR. Setting unit 31 lowers the communication level if measured PER is more than or equal to a threshold value (e.g., 10%).

User data transmission management unit 34 manages the user data transmitted to wireless terminal 3.

Coding unit 33 encodes a downlink signal according to the MCS coding rate instructed from MCS setting unit 31. MCS defines the modulation scheme (e.g., QPSK, 16QAM, 64AQAM) and the coding rate (e.g., ½, ⅔, ¾).

Modulation unit 32 modulates the coded downlink signal to a wireless terminal according to the MCS modulation scheme instructed from MCS setting unit 31.

Switch notification unit 36 outputs a signal notifying MCS of the downlink signal to a wireless terminal switched in communication level by MCS setting unit 31.

(Table Selecting Operation)

FIG. 5 is a flowchart showing a procedure of switching table selection processing in the wireless base station according to the first embodiment. Here, users making communication shall be given user numbers starting from 1, respectively.

Referring to FIG. 5, a user number i is set at 1 (step S201).

Terminal request unit 43 instructs that sounding signals should be continuously transmitted through a plurality of antennas of a wireless terminal of a user of user number i (step S202).

Next, terminal request unit 43 receives the sounding signals through the plurality of antennas of the wireless terminal of the user of user number i (step S203).

Next, SM suitability determination unit 42 calculates reception response vectors of the plurality of sounding signals received in step S203 (step S204).

Next, SM suitability determination unit 42 calculates spatial correlation value SR of the sounding signals transmitted through the plurality of antennas of the wireless terminal based on the plurality of reception response vectors (step S205).

If spatial correlation value SR is less than threshold value TH1 (YES in step S206), SM suitability determination unit 42 determines that the SM scheme is suitable, and causes setting unit 31 to select the first switching table. Setting unit 31 switches the communication level based on the first switching table (step S207).

If spatial correlation value SR is more than or equal to threshold value TH1 and less than threshold value TH2 (NO in step S206 and YES in step S208), SM suitability determination unit 42 determines that the suitability/unsuitability of the SM scheme is neutral, and causes setting unit 31 to select the second switching table. Setting unit 31 switches the communication level based on the second switching table (step S209).

If spatial correlation value SR is more than or equal to threshold value TH2 (NO in step S206 and NO in step S208), SM suitability determination unit 42 determines that the SM scheme is unsuitable, and causes setting unit 31 to select the third switching table. Setting unit 31 switches the communication level based on the third switching table (step S210).

If user number i has not reached the total number of users making communication (NO in step S211), i is incremented by 1 (step S212), and the process is returned to step S202.

(Switching Operation for Communication Level)

FIG. 6 is a flowchart showing a procedure of a switching operation for a communication level for a single frame in the wireless base station according to the first embodiment.

Referring to FIG. 6, setting unit 31 sets user number i at 1 (step S100).

Next, communication quality management unit 28 obtains PER and CINR of a downlink signal in the wireless terminal of user i included in an up subframe (steps S101 and S102).

If the MIMO communication scheme at the current communication level is the STC scheme (YES in step S103), and if the communication level of the wireless terminal of user number i can be raised in the switching table (i.e., if obtained CINR is larger than the range of CINR belonging to the current communication level (YES in step S104)), and if the MIMO communication scheme at the communication level after raising is the SM scheme in the switching table (YES in step S105), setting unit 31 raises the communication level. That is, setting unit 31 switches the MIMO communication scheme to the SM scheme, and switches MCS based on the switching table (step S108).

On the other hand, if the MIMO communication scheme at the current communication level is the STC scheme (YES in step S103), and if the communication level of the wireless terminal of user number i can be raised in the switching table (YES in step S104), and if the MIMO communication scheme at the communication level after raising is the STC scheme in the switching table (NO in step S105), setting unit 31 raises the communication level. That is, setting unit 31 maintains the MIMO communication scheme at the STC scheme, and raises MCS based on the switching table (step S110).

On the other hand, if the MIMO communication scheme at the current communication level is the STC scheme (YES in step S103), and if the communication level of the wireless terminal of user number i can be lowered in the switching table (i.e., if obtained PER is more than or equal to a threshold value (e.g., 10%) (NO in step S104 and YES in step S111), setting unit 31 lowers the communication level. That is, setting unit 31 maintains the MIMO communication scheme at the STC scheme, and lowers MCS based on the switching table (step S112).

On the other hand, when the MIMO communication scheme at the current communication level is the STC scheme (YES in step S103), and if the communication level of the wireless terminal of user number i cannot be raised or lowered in the switching table (NO in step S111), setting unit 31 maintains the communication level. That is, setting unit 31 maintains the MIMO communication scheme at the STC scheme, and maintains MCS (step S113).

On the other hand, if the MIMO communication scheme at the current communication level is the SM scheme (NO in step S103), and if the communication level of the wireless terminal of user number i can be lowered in the switching table (YES in step S114), and if the MIMO communication scheme at the communication level after lowering is the STC scheme in the switching table (YES in step S115), setting unit 31 lowers the communication level. That is, setting unit 31 switches the MIMO communication scheme to the STC scheme, and switches MCS based on the switching table (step S118).

On the other hand, if the MIMO communication scheme at the current communication level is the SM scheme (NO in step S103), and if the communication level of the wireless terminal of user number i can be lowered in the switching table (YES in step S114), and if the MIMO communication scheme at the communication level after lowering is the SM scheme in the switching table (NO in step S115), setting unit 31 lowers the communication level. That is, setting unit 31 maintains the MIMO communication scheme at the SM scheme, and lowers MCS based on the switching table (step S119).

On the other hand, if the MIMO communication scheme at the current communication level is the SM scheme (NO in step S103), and if the communication level of the wireless terminal of user number i can be raised in the switching table (NO in step S114 and YES in step S120), setting unit 31 raises the communication level. That is, setting unit 31 maintains the MIMO communication scheme at the SM scheme, and raises the communication level based on the switching table (step S121).

On the other hand, if the MIMO communication scheme at the current communication level is the SM scheme (NO in step S103), and if the communication level of the wireless terminal of user number i cannot be raised or lowered in the switching table (NO in step S120), setting unit 31 maintains the communication level. That is, setting unit 31 maintains the MIMO communication scheme at the SM scheme, and maintains MCS (step S122).

When user number i is not equal to the total number of users making communication (NO in step S123), setting unit 31 increments user number i by 1 (step S124), and returns to step S101.

As described above, according to the present embodiment, the MIMO scheme can be switched at an optimum switching point depending on the situation of a propagation path by determining the suitability/unsuitability of the SM scheme based on the spatial correlation value of reception response vectors of sounding signals from a wireless terminal.

First Variation of First Embodiment

In this variation, SM suitability determination unit 42 calculates reception response vector H1 and reception response vector H2 similarly to the first embodiment.

SM suitability determination unit 42 calculates a difference PD between the magnitude of reception response vector H1 and the magnitude of reception response vector H2 according to Equation (6) set forth below.

$$PD=\|H1|-|H2\|\quad(6)$$

If difference PD in magnitude between the reception response vectors is less than threshold value TH1, SM suitability determination unit 42 determines that the SM scheme is suitable, and causes setting unit 31 to select the first switching table.

If difference PD in magnitude between the reception response vectors is more than or equal to threshold value TH1 and less than threshold value TH2, SM suitability determination unit 42 determines that the suitability/unsuitability of the SM scheme is neutral, and causes setting unit 31 to select the second switching table.

If difference PD in magnitude between the reception response vectors is more than or equal to threshold value TH2, SM suitability determination unit 42 determines that the SM scheme is unsuitable, and causes setting unit 31 to select the third switching table.

The reason for setting as described above will be described.

It is considered that a small difference in magnitude between reception response vectors is due to different orientations of the antenna (1) of the wireless terminal and the antenna (2) of the wireless terminal or a long distance therebetween. For the wireless terminal having such antennas, communication by the SM scheme is suitable.

In contrast, it is considered that a large difference in magnitude between reception response vectors is due to the same orientation or the antenna (1) of the wireless terminal and the antenna (2) of the wireless terminal or a short distance therebetween. For the wireless terminal having such antennas, communication by the SM scheme is unsuitable.

(Table Selecting Operation)

Figure 7:
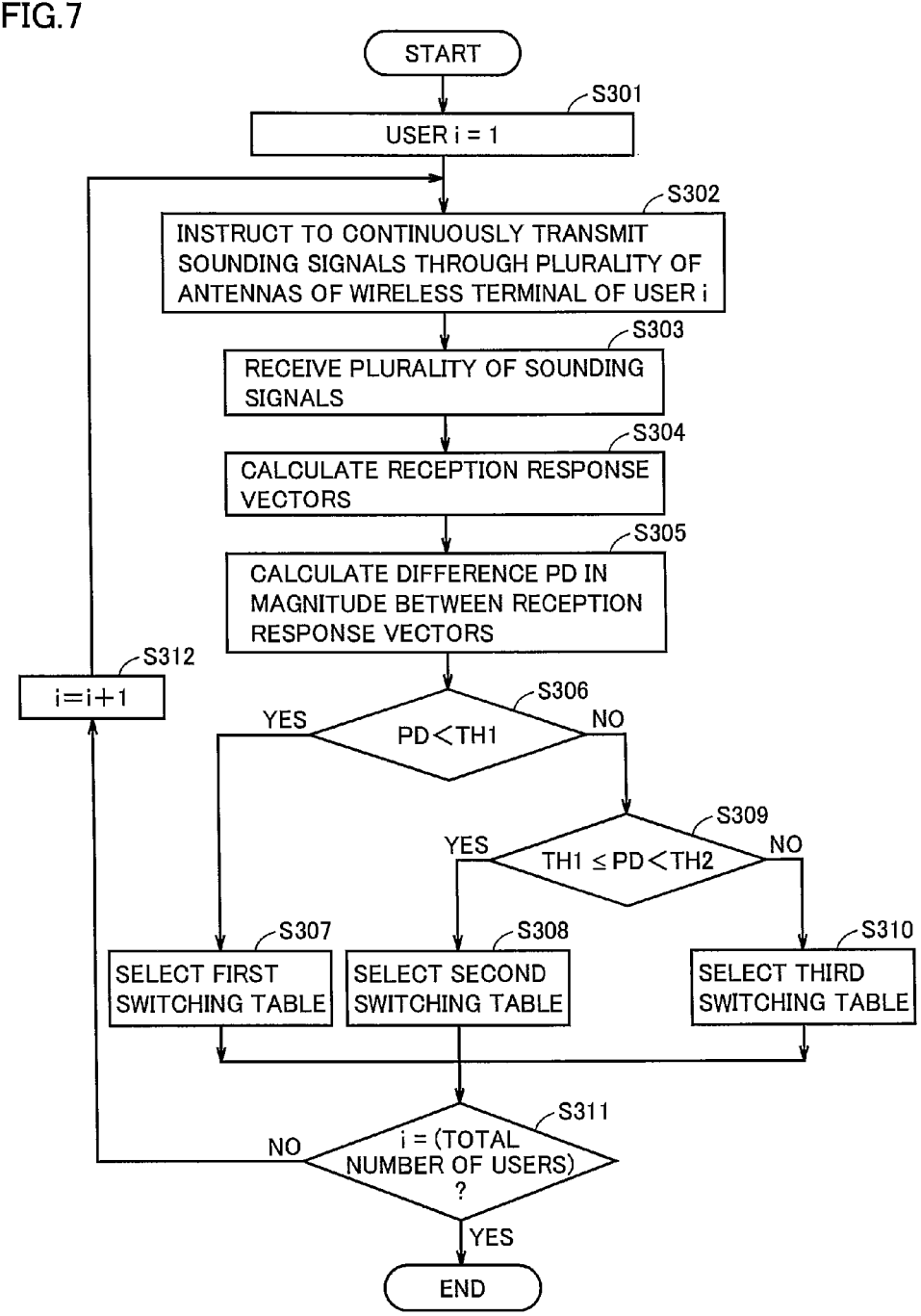
FIG. 7 is a flowchart showing a procedure of switching table selection processing in a wireless base station according to a first variation of the first embodiment.

FIG. 7 is a flowchart showing a procedure of switching table selection processing in a wireless base station according to the first variation of the first embodiment. Here, users making communication shall be given user numbers starting from 1, respectively.

Referring to FIG. 7, user number i is set at 1 (step S301).

Terminal request unit 43 instructs that sounding signals should be continuously transmitted through a plurality of antennas of a wireless terminal of a user of user number i (step S302).

Next, terminal request unit 43 receives the sounding signals from the plurality of antennas of the wireless terminal of the user of user number i (step S303).

Next, SM suitability determination unit 42 calculates reception response vectors of the plurality of sounding signals received in step S303 (step S304).

Next, SM suitability determination unit 42 calculates difference PD in magnitude between the plurality of reception response vectors (step S305).

If difference PD in magnitude between the reception response vectors is less than threshold value TH1 (YES in step S306), SM suitability determination unit 42 determines that the SM scheme is suitable, and causes setting unit 31 to select the first switching table. Setting unit 31 switches the communication level based on the first switching table (step S307).

If difference PD in magnitude between the reception response vectors is more than or equal to threshold value TH1 and less than threshold value TH2 (NO in step S306 and YES in step S309), SM suitability determination unit 42 determines that the suitability/unsuitability of the SM scheme is neutral, and causes setting unit 31 to select the second switching table. Setting unit 31 switches the communication level based on the second switching table (step S308).

When difference PD in magnitude between reception response vectors is more than or equal to threshold value TH2 (NO in step S306 and NO in step S309), SM suitability determination unit 42 determines that the SM scheme is unsuitable, and causes setting unit 31 to select the third switching table. Setting unit 31 switches the communication level based on the third switching table (step S310).

When user number i has not reached the total number of users making communication (NO in step S311), i is incremented by 1 (step S312), and the process is returned to step S302.

As described above, according to the present embodiment, the MIMO scheme can be switched at an optimum switching point depending on the situation of a propagation path by determining the suitability/unsuitability of the SM scheme based on the difference in magnitude between reception response vectors of sounding signals from a wireless terminal.

Second Variation of First Embodiment

In this variation, SM suitability determination unit 42 calculates reception response vector H1 and reception response vector H2 similarly to the first embodiment.

SM suitability determination unit 42 calculates an eigenvalue of a correlation matrix $R^H R$ of a propagation path matrix R=(H1, H2) composed of reception response vector H1 and reception response vector H2. It should be noted that, with respect to matrix R, $R^H$ represents a conjugate transposed matrix of matrix R.

When three or more eigenvalues more than or equal to threshold value TH1 (e.g., a value indicating the significance of eigenvalue) exist, SM suitability determination unit 42 determines that the SM scheme is suitable, and causes setting unit 31 to select the first switching table.

When two eigenvalues more than or equal to threshold value TH1 exist, SM suitability determination unit 42 determines that the suitability/unsuitability of the SM scheme is neutral, and causes setting unit 31 to select the second switching table.

When there is one or less eigenvalue more than or equal to threshold value TH1, SM suitability determination unit 42 determines that the SM scheme is unsuitable, and causes setting unit 31 to select the third switching table.

The reason for setting as described above will be described.

It is considered that a large number of significant eigenvalues among eigenvalues of the correlation matrix of the propagation path matrix is due to different orientations of the antenna (1) of the wireless terminal and the antenna (2) of the wireless terminal or a long distance therebetween. For the wireless terminal having such antennas, communication by the SM scheme is suitable.

In contrast, it is considered that a small number of significant eigenvalues among eigenvalues of the correlation matrix of the propagation path matrix is due to the same orientation of the antenna (1) of the wireless terminal and the antenna (2) of the wireless terminal or a short distance therebetween. For the wireless terminal having such antennas, communication by the SM scheme is unsuitable.

(Table Selecting Operation)

Figure 8:
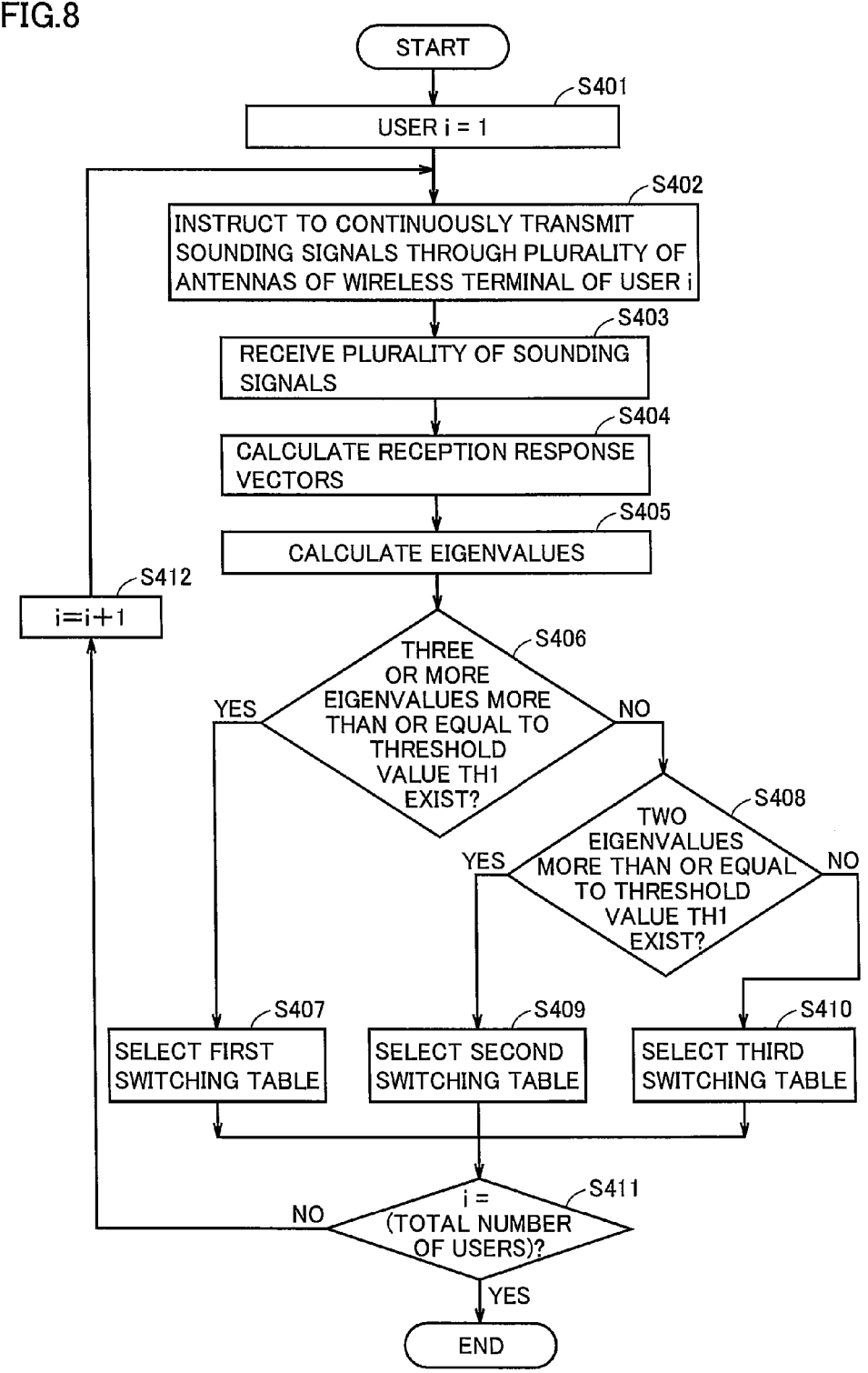
FIG. 8 is a flowchart showing a procedure of switching table selection processing in a wireless base station according to a second variation of the first embodiment.

FIG. 8 is a flowchart showing a procedure of switching table selection processing in a wireless base station according to the second variation of the first embodiment. Here, users making communication shall be given user numbers starting from 1, respectively.

Referring to FIG. 8, user number i is set at 1 (step S401).

Terminal request unit 43 instructs that sounding signals should be continuously transmitted through a plurality of antennas of a wireless terminal of a user of user number i (step S402).

Next, terminal request unit 43 receives the sounding signals through the plurality of antennas of the wireless terminal of the user of user number i (step S403).

Next, SM suitability determination unit 42 calculates reception response vectors of the plurality of sounding signals received in step S403 (step S404).

Next, SM suitability determination unit 42 calculates eigenvalues of a correlation matrix of a propagation path matrix composed of the plurality of reception response vectors (step S405).

When three or more eigenvalues more than or equal to threshold value TH1 exist (YES in step S406), SM suitability determination unit 42 determines that the SM scheme is suitable, and causes setting unit 31 to select the first switching table. Setting unit 31 switches the communication level based on the first switching table (step S407).

When two eigenvalues more than or equal to threshold value TH1 exist (NO in step S406 and YES in step S408), SM suitability determination unit 42 determines that the suitability/unsuitability of the SM scheme is neutral, and causes setting unit 31 to select the second switching table. Setting unit 31 switches the communication level based on the second switching table (step S409).

When there is one or less eigenvalue more than or equal to threshold value TH1 (NO in step S406 and NO in step S408), SM suitability determination unit 42 determines that the SM scheme is unsuitable, and causes setting unit 31 to select the third switching table. Setting unit 31 switches the communication level based on the third switching table (step S410).

When user number i has not reached the total number of users making communication (NO in step S411), i is incremented by 1 (step S412), and the process is returned to step S402.

As described above, according to the present embodiment, the MIMO scheme can be switched at an optimum switching point depending on the situation of a propagation path by determining the suitability/unsuitability of the SM scheme based on eigenvalues of a correlation matrix of a propagation path matrix composed of reception response vectors of sounding signals from a wireless terminal.

Second Embodiment (Configuration)

Figure 9:
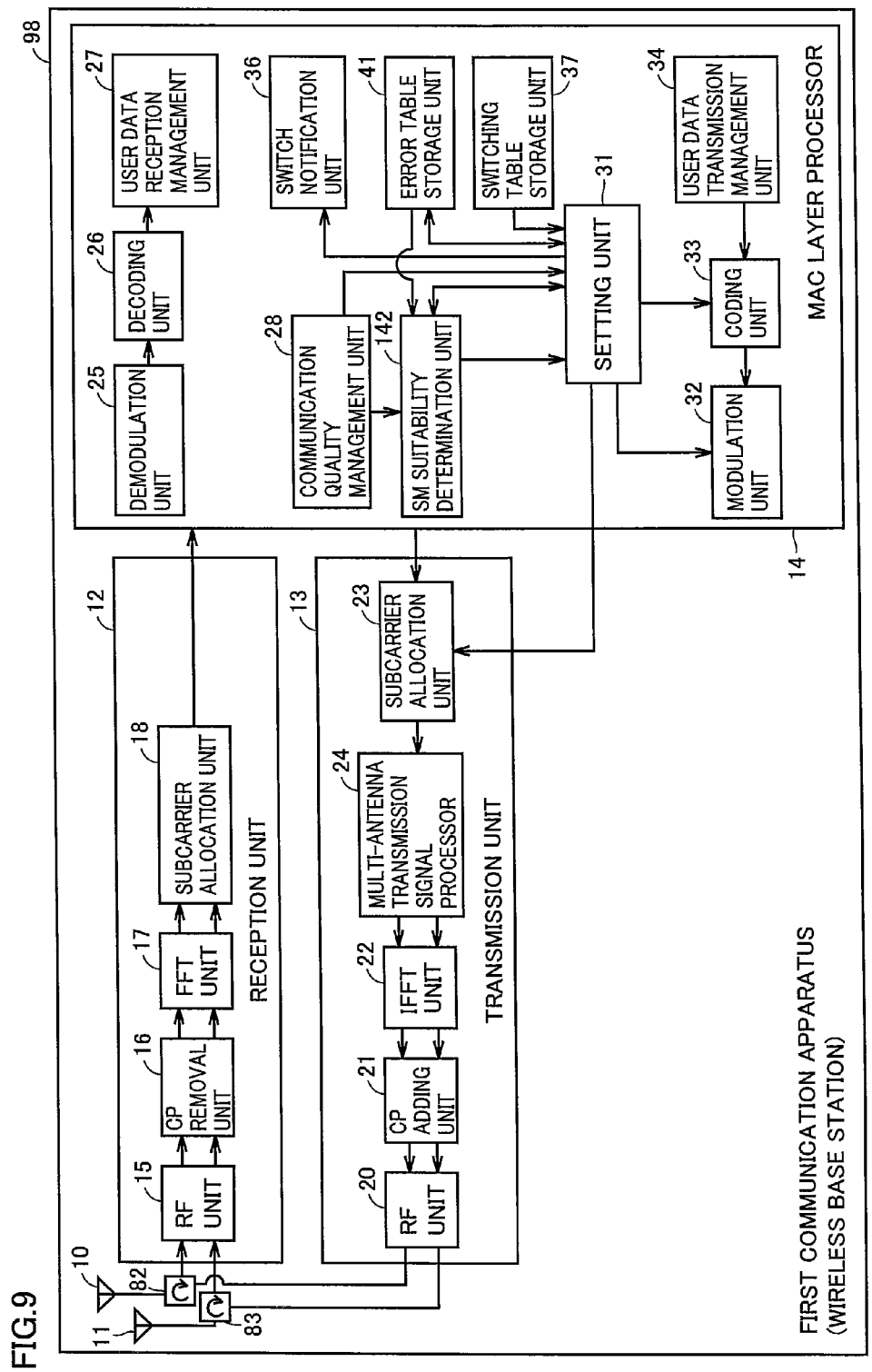
FIG. 9 represents a configuration of a wireless base station according to a second embodiment.

FIG. 9 represents a configuration of a wireless base station according to a second embodiment.

This wireless base station is different from the wireless base station of FIG. 2 in the function of the SM suitability determination unit and in that an error table storage unit 41 is added and terminal request unit 43 is not included.

(Relation Between CINR and PER)

Figures 10, 11:
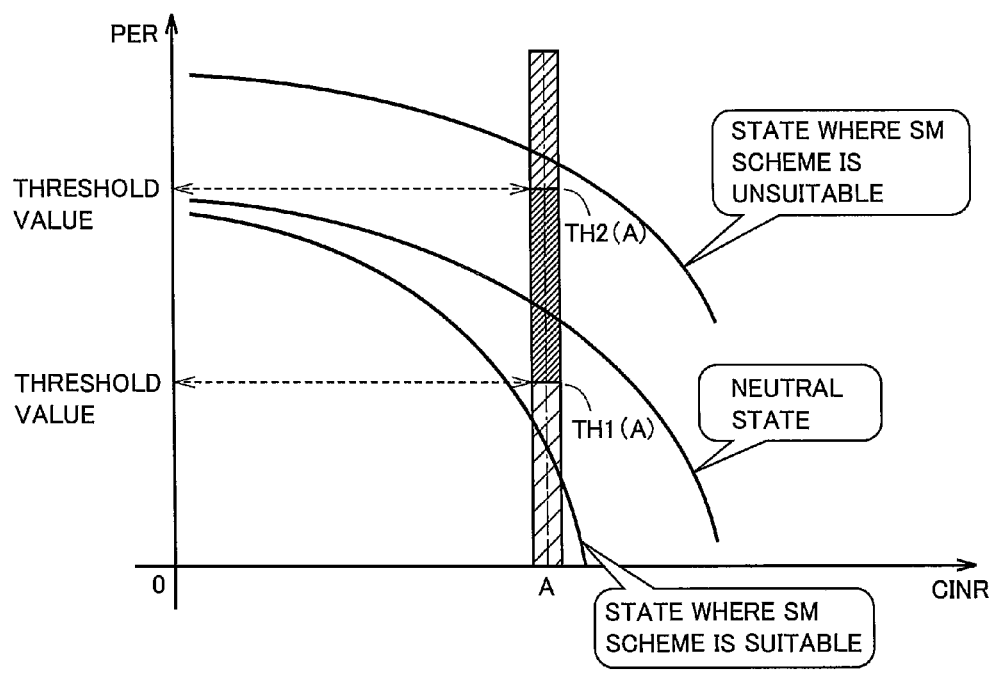
FIG. 10 represents the relation between CINR and PER relevant to suitability/unsuitability of the SM scheme.
FIG. 11 represents an example of an error table.

FIG. 10 represents the relation between CINR and PER relevant to suitability/unsuitability of the SM scheme.

FIG. 10 represents the result of experiments conducted in communication by the SM scheme. During communication by the SM scheme, PER and CINR are obtained, and the suitability of the SM scheme at that time is determined. The graph of FIG. 10 is the plotted result. The suitability of the SM scheme can be determined based on, for example, throughput, which is the transmission quantity per unit time, and the like.

For example, when CINR is A, it is in the state where the SM scheme is suitable if PER is less than a threshold value TH1(A). If PER is more than or equal to threshold value TH1(A) and less than a threshold value TH2(A), it is in the state where the suitability/unsuitability of the SM scheme is neutral. If PER is more than or equal to threshold value TH2(A), it is in the state where the SM scheme is unsuitable.

Error table storage unit 41 stores an error table. The error table is created based on the result obtained by the above-mentioned experiments.

FIG. 11 represents an example of the error table.

As shown in FIG. 11, the error table defines, with respect to CINR, threshold value TH1 of PER indicating the limit between the state where the SM scheme is suitable and the neutral state and threshold value TH2 of PER indicating the limit between the state where the suitability/unsuitability of the SM scheme is neutral and the state where it is unsuitable.

Values obtained from the experiments described with reference to FIG. 10 are used for threshold value TH1 and threshold value TH2.

SM suitability determination unit 142 reads the values of threshold value TH1 and threshold value TH2 corresponding to CINR obtained by communication quality management unit 28, from the error table. If PER obtained by communication quality management unit 28 is less than threshold value TH1, SM suitability determination unit 142 determines that the SM scheme is suitable, and causes setting unit 31 to select the first switching table. If obtained PER is more than or equal to threshold value TH1 and less than threshold value TH2, SM suitability determination unit 142 determines that the suitability/unsuitability of the SM scheme is neutral, and causes setting unit 31 to select the second switching table. If obtained PER is more than or equal to threshold value TH2, SM suitability determination unit 142 determines that the SM scheme is unsuitable, and causes setting unit 31 to select the third switching table.

(Operation)

Figure 12:
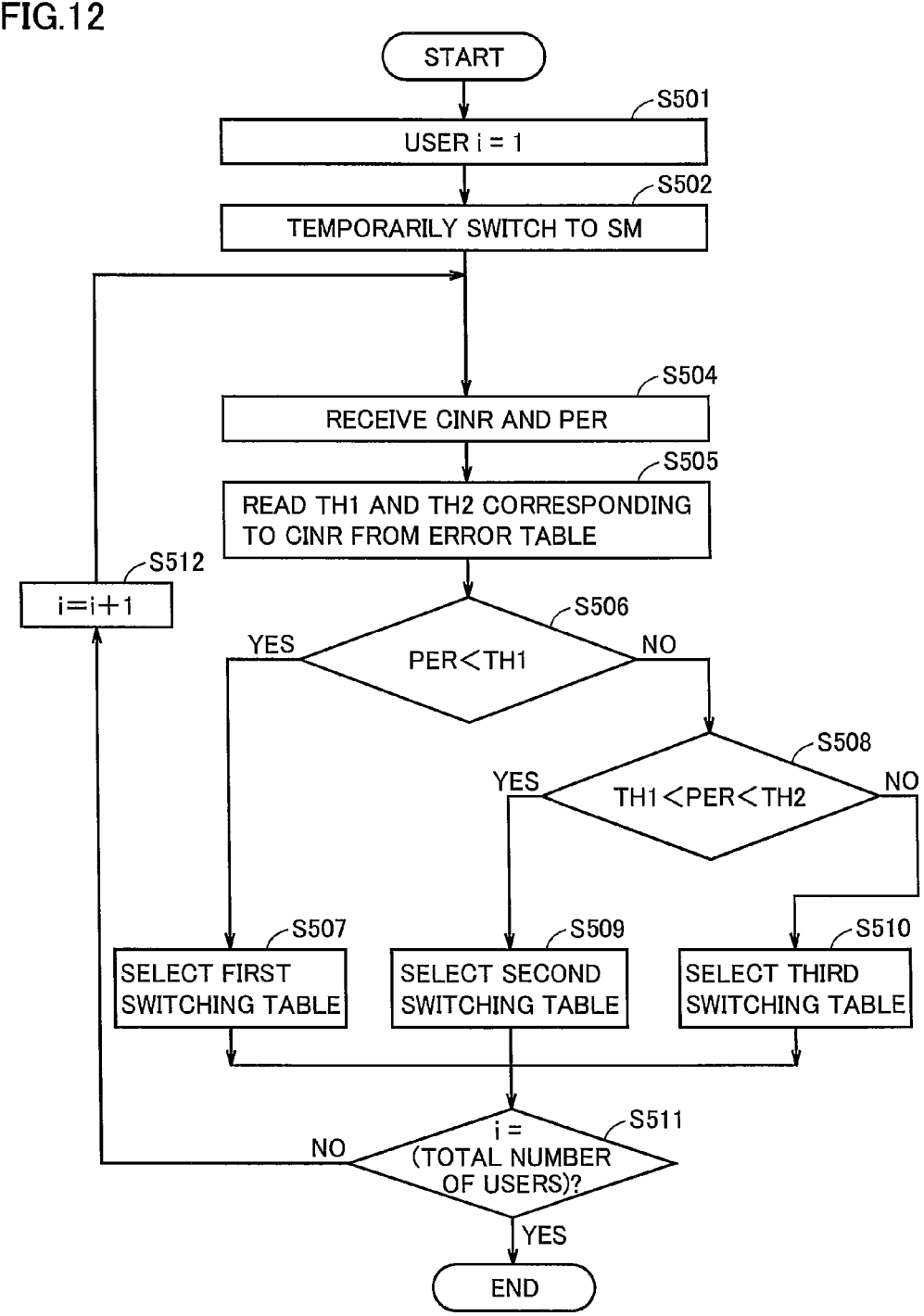
FIG. 12 is a flowchart showing a procedure of switching table selection processing in the wireless base station according to the second embodiment.

FIG. 12 is a flowchart showing a procedure of switching table selection processing in the wireless base station according to the second embodiment. Here, users making communication shall be given user numbers starting from 1, respectively.

Referring to FIG. 12, user number i is set at 1 (step S501).

Setting unit 31 temporarily switches the MIMO communication scheme to the SM scheme only for a predetermined time period (step S502).

Next, communication quality management unit 28 obtains PER and CINR of a downlink signal in the wireless terminal of user i included in an up subframe (step S504).

SM suitability determination unit 142 reads the values of threshold value TH1 and threshold value TH2 corresponding to obtained CINR, from the error table (step S505).

If obtained PER is less than threshold value TH1 (YES in step S506), SM suitability determination unit 142 determines that the SM scheme is suitable, and causes setting unit 31 to select the first switching table. Setting unit 31 switches the communication level based on the first switching table (step S507).

If obtained PER is more than or equal to threshold value TH1 and less than threshold value TH2 (NO in step S506 and YES in step S508), SM suitability determination unit 142 determines that the suitability/unsuitability of the SM scheme is neutral, and causes setting unit 31 to select the second switching table. Setting unit 31 switches the communication level based on the second switching table (step S509).

If obtained PER is more than or equal to threshold value TH2 (NO in step S506 and NO in step S508), SM suitability determination unit 142 determines that the SM scheme is unsuitable, and causes setting unit 31 to select the third switching table. Setting unit 31 switches the communication level based on the third switching table (step S510).

When user number i has not reached the total number of users making communication (NO in step S511), i is incremented by 1 (step S512), and the process is returned to step S504.

As described above, according to the present embodiment, the MIMO scheme can be switched at an optimum switching point depending on the situation of a propagation path by determining the suitability/unsuitability of the SM scheme based on the relation between CINR and PER of a signal transmitted by the SM scheme and received by a wireless terminal.

It is noted that, in the embodiments of the present invention, the suitability/unsuitability of the SM scheme is determined based on the relation between CINR and PER of a signal transmitted by the SM scheme and received by a wireless terminal, however, an index value that can replace PER (e.g., NACK response incidence of HARQ (Hybrid Automatic Repeat reQuest)) can be used instead of PER.

Variation of Second Embodiment

In this variation, communication quality management unit 28 receives RI (Rank Indicator) from a wireless terminal. RI indicates preferable multiplicity of communication from a wireless base station to a wireless terminal.

If the preferable multiplicity indicated by received RI is more than or equal to a threshold value (e.g., 2), SM suitability determination unit 142 determines that the SM scheme is suitable, and causes setting unit 31 to select the first switching table. If the preferable multiplicity indicated by received RI is less than a threshold value TH (e.g., 2), SM suitability determination unit 142 determines that the SM scheme is unsuitable, and causes setting unit 31 to select the third switching table.

(Operation)

Figure 13:
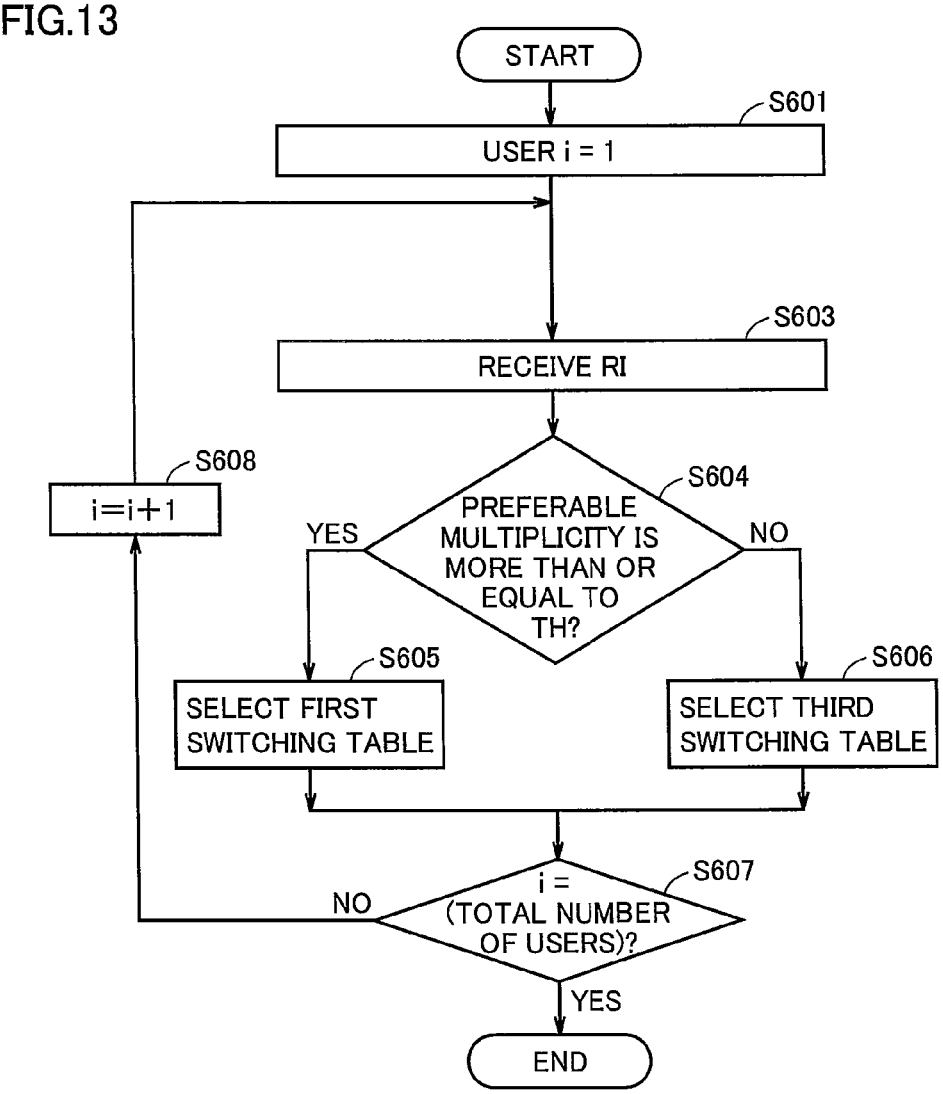
FIG. 13 is a flowchart showing a procedure of switching table selection processing in a wireless base station according to a variation of the second embodiment.

FIG. 13 is a flowchart showing a procedure of switching table selection processing in a wireless base station of a variation of the second embodiment. Here, users making communication shall be given user numbers starting from 1, respectively.

Referring to FIG. 13, user number is set at 1 (step S601).

Communication quality management unit 28 receives RI from the wireless terminal of user i included in an up subframe (step S603).

If the preferable multiplicity indicated by received RI is more than or equal to TH (YES in step S604), SM suitability determination unit 142 determines that the SM scheme is suitable, and causes setting unit 31 to select the first switching table. Setting unit 31 switches the communication level based on the first switching table (step S605).

If the preferable multiplicity indicated by received RI is less than TH (NO in step S604), SM suitability determination unit 142 determines that the SM scheme is unsuitable, and causes setting unit 31 to select the third switching table. Setting unit 31 switches the communication level based on the third switching table (step S606).

When user number i has not reached the total number of users making communication (NO in step S607), i is incremented by 1 (step S608), and the process is returned to step S603.

As described above, according to the present embodiment, the MIMO scheme can be switched at an optimum switching point depending on the situation of a propagation path by determining the suitability/unsuitability of the SM scheme based on RI (Rank Indicator) transmitted from a wireless terminal.

Third Embodiment (Configuration)

Figure 14:
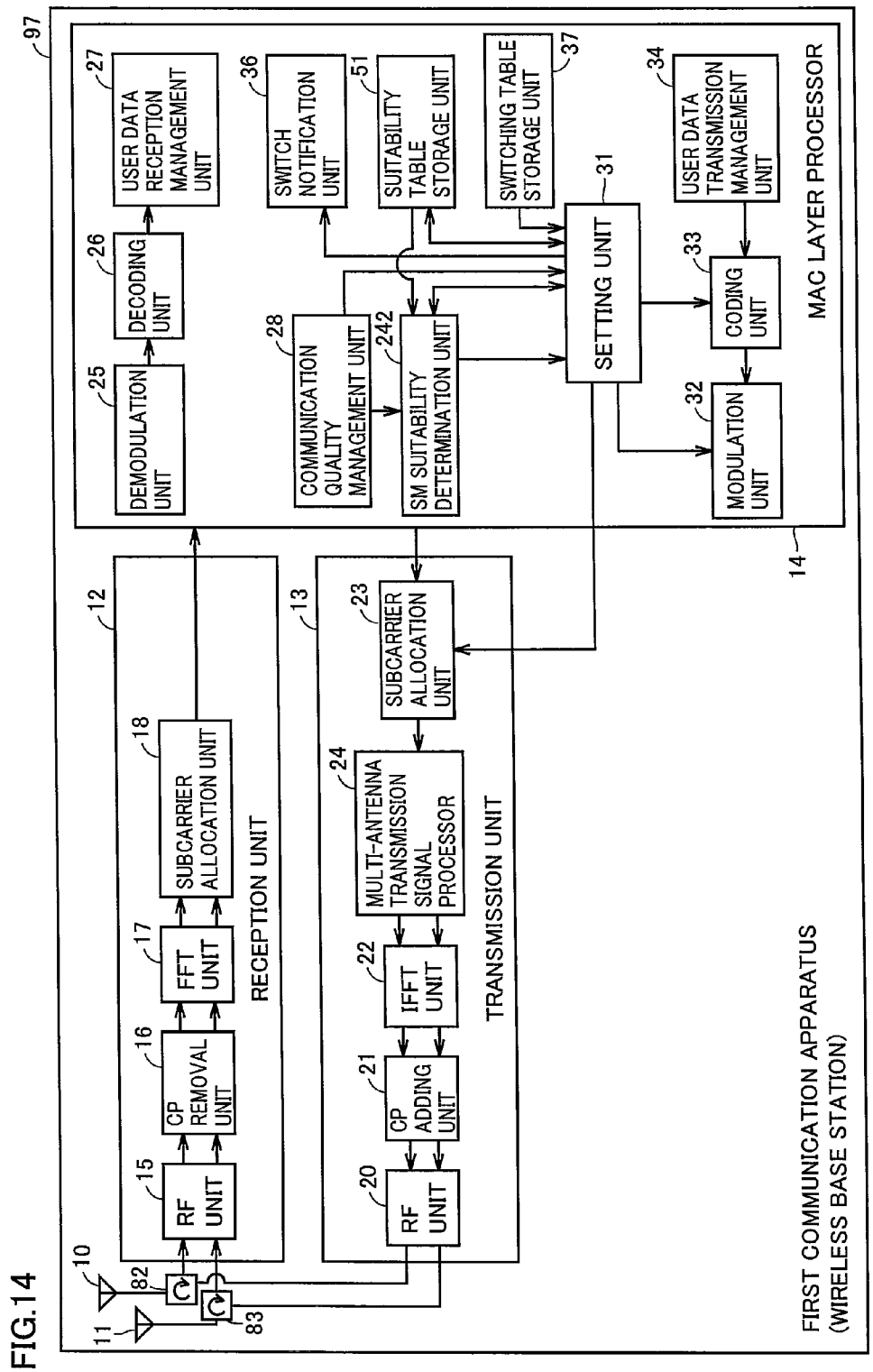
FIG. 14 represents a configuration of a wireless base station according to a third embodiment.

FIG. 14 represents a configuration of a wireless base station according to a third embodiment.

This wireless base station is different from the wireless base station of FIG. 2 in the function of an SM suitability determination unit 242. Moreover, this wireless base station does not include terminal request unit 43, but includes a suitability table storage unit 51.

Suitability table storage unit 51 stores an SM suitability table for a wireless terminal and an SM suitability table for this wireless base station.

The SM suitability table for a wireless terminal defines the SM suitability based on the number of antennas of a wireless terminal, a difference in gain between the antennas of the wireless terminal, and past SM communication achievements of the wireless terminal.

FIG. 15 represents an example of an SM suitability table for a wireless terminal.

As shown in FIG. 15, this SM suitability table for a wireless terminal defines that the SM scheme is suitable for a wireless terminal when conditions that the number of antennas of the wireless terminal is more than or equal to X1, the maximum value of a difference in gain between the antennas of the wireless terminal is less than or equal to Y1 [dB], and past SM communication achievements occupy more than or equal to 50% of all the communications (communications by SM and communications by STC) are met.

It is also defined that the SM scheme is unsuitable for the wireless terminal when conditions that the number of antennas of the wireless terminal is less than or equal to X2, the maximum value of a difference in gain between the antennas of the wireless terminal is more than or equal to Y2 [dB], and when past SM communication achievements occupy less than or equal to 20% of all the communications (communications by SM and communications by STC) are met. The communication achievements are adopted because, when the SM scheme is unsuitable, PER increases even if a transition is made to the SM scheme, and a return to the STC scheme is made, resulting in many communication achievements by the STC scheme and few communication achievements by the SM scheme.

When the number of antennas of a wireless terminal and the difference in gain between the antennas of the wireless terminal do not meet the above conditions, it is determined that the wireless terminal is a neutral terminal which does not particularly have suitability or unsuitability for the SM scheme.

The SM suitability table for the wireless base station defines the suitability based on the installation location of the wireless base station.

FIG. 16 represents an example of an SM suitability table for the wireless base station.

As shown in FIG. 16, this SM suitability table for the wireless base station defines that the installation location of the wireless base station is suitable for the SM scheme when conditions that the installation location of the wireless base station is indoor, the distance from another nearest base station is more than or equal to Y1 (km), and the installation location of the wireless base station is not on the road, not near the rail, or not within a vehicle are met.

Moreover, it is also defined that the installation location of the wireless base station is unsuitable for the SM scheme when conditions that the installation location of the wireless base station is indoor, the distance from another nearest base station is less than or equal to Y2 (km), and the installation location of the wireless base station is on the road, near the rail, or within a vehicle are met.

When the installation location of the wireless base station does not meet the above conditions, it is determined that the installation location of the wireless base station is a neutral installation location which does not particularly have suitability or unsuitability for the SM scheme.

SM suitability determination unit 242 refers to the suitability table for a wireless terminal to determine the suitability/unsuitability of the wireless terminal for the SM scheme, and refers to the suitability table for the wireless base station to determine the suitability/unsuitability of the installation location of the wireless base station for the SM scheme.

SM suitability determination unit 242 refers to the suitability table for a wireless terminal, and when determined that the wireless terminal is a terminal suitable for the SM scheme, causes setting unit 31 to select the first switching table. SM suitability determination unit 242 refers to the suitability table for a wireless terminal, and when determined that the wireless terminal is a terminal unsuitable for the SM scheme, causes setting unit 31 to select the third switching table. SM suitability determination unit 242 refers to the suitability table for the wireless base station, and when determined that the installation location of the wireless base station is a location suitable for the SM scheme, causes setting unit 31 to select the first switching table. SM suitability determination unit 242 refers to the suitability table for the wireless base station, and when determined that the installation location of the wireless base station is a location unsuitable for the SM scheme, causes setting unit 31 to select the third switching table. When determined that the wireless terminal is a neutral terminal which does not particularly have suitability or unsuitability for the SM scheme, or when determined that the installation location of the wireless base station is a neutral installation location which does not particularly have suitability or unsuitability for the SM scheme, SM suitability determination unit 242 causes setting unit 31 to select the second switching table.

(Operation)

FIG. 17 is a flowchart showing a procedure of switching table selection processing in the wireless base station according to the third embodiment. Here, users making communication shall be given user numbers starting from 1, respectively.

Referring to FIG. 17, user number i is set at 1 (step S701).

SM suitability determination unit 242 refers to the suitability table for a wireless terminal, and when determined that the wireless terminal of a user of user number i is a terminal suitable for the SM scheme (YES in step S702), causes setting unit 31 to select the first switching table. Setting unit 31 switches the communication level based on the first switching table (step S703).

SM suitability determination unit 242 refers to the suitability table for a wireless terminal, and when determined that the wireless terminal of the user of user number i is a terminal unsuitable for the SM scheme (YES in step S704), causes setting unit 31 to select the third switching table. Setting unit 31 switches the communication level based on the third switching table (step S705).

SM suitability determination unit 242 refers to the suitability table for the wireless base station, and when determined that the installation location of the wireless base station is a location suitable for the SM scheme (YES in step S706), causes setting unit 31 to select the first switching table. Setting unit 31 switches the communication level based on the first switching table (step S707).

SM suitability determination unit 242 refers to the suitability table for the wireless base station, and when determined that the installation location of the wireless base station is a location unsuitable for the SM scheme (YES in step S708), causes setting unit 31 to select the third switching table. Setting unit 31 switches the communication level based on the third switching table (step S709).

When determined that the wireless terminal of the user of user number i is a neutral terminal which does not particularly have suitability or unsuitability for the SM scheme, or when determined that the installation location of the wireless base station is a neutral installation location which does not particularly have suitability or unsuitability for the SM scheme (NO in steps S702, S704, S706, and S708), SM suitability determination unit 242 causes setting unit 31 to select the second switching table. Setting unit 31 switches the communication level based on the second switching table (step S710).

When user number i has not reached the total number of users making communication (NO in step S711), i is incremented by 1 (step S712), and the process is returned to step S702.

As described above, according to the present embodiment, the MIMO scheme can be switched at an optimum switching point depending on the situation of a propagation path by determining the suitability/unsuitability of the SM scheme based on the characteristics of the device of a wireless terminal itself and the installation location of the wireless base station.

(Variation)

The present invention is not limited to the above-described embodiments, but may include modifications set forth below.

(1) Sounding Signal

In the first embodiment of the present invention, a reception response vector of a sounding signal from a wireless terminal is calculated, however, a reception response vector of a user data signal from a wireless terminal may be calculated, instead of the sounding signal.

(2) SM Suitability of Wireless Terminal

In the third embodiment of the present invention, the SM suitability of a wireless terminal shall be determined based on the three conditions of the number of antennas of the wireless terminal, the difference in gain between the antennas of the wireless terminal, and past SM communication achievements of the wireless terminal, however, the SM suitability of the wireless terminal may be determined by one of these conditions or any combination of two conditions.

(3) SM suitability of Installation Location of Wireless Base Station

In the embodiments of the present invention, the SM suitability of the installation location of a wireless base station shall be determined based on the three conditions of whether the installation location of the wireless base station is indoor or outdoor, the distance from another nearest base station, and whether the installation location of the wireless base station is on the road, near the rail, or within a vehicle, however, the SM suitability of the installation location of the wireless base station may be determined by one of these conditions or any combination of two conditions.

It is to be understood that the embodiments disclosed herein are only by way of example, and is not to be taken by way of limitation. The scope of the present invention is not limited by the description above, but rather by the terms of the appended claims, and is intended to include any modification within the scope and meaning equivalent to the terms of the claims.

REFERENCE SIGNS LIST 2, 97, 98 wireless base station; 3-1 to 3-$n$ wireless terminal; 10, 11 antenna; 15, 20 RF unit; 16 CP removal unit; 17 FFT unit; 18, 23 subcarrier allocation unit; 21 CP adding unit; 22 IFFT unit; 24 multi-antenna transmission signal processor; 25 demodulation unit; 26 decoding unit; 27 user data reception management unit; 28 communication quality management unit; 31 setting unit; 32 modulation unit; 33 coding unit; 34 user data transmission management unit; 36 switch notification unit; 37 switching table storage unit; 41 error table storage unit; 42, 142, 242 SM suitability determination unit; 43 terminal request unit; 51 suitability table storage unit.

The invention claimed is:

1. A communication apparatus comprising:
   a plurality of antennas;
   a modulation unit configured to modulate a transmission signal according to a set modulation scheme and coding rate;
   a coding unit configured to code the transmission signal according to the set modulation scheme and coding rate;
   a transmission unit configured to code a data stream of the transmission signal by a non-spatial multiplexing scheme when a set Multi Input Multi Output (MIMO) communication scheme is the non-spatial multiplexing scheme, and to subject a plurality of data streams of the transmission signal to spatial multiplexing when the set MIMO communication scheme is a spatial multiplexing scheme;
   a communication quality management unit configured to obtain communication quality of a signal received at another communication apparatus which is a communication partner;
   a determination unit configured to determine suitability of communication by the spatial multiplexing scheme to the other communication apparatus which is the communication partner; and
   a setting unit configured to increase a communication level defined by a modulation scheme, a coding rate and a MIMO communication scheme as said obtained communication quality is better, the communication level by the non-spatial multiplexing scheme being lower than the communication level by the spatial multiplexing scheme, and in each MIMO communication scheme, the communication level being higher as a level of the modulation scheme and the coding rate is higher,
   when switching the communication level from the non-spatial multiplexing scheme to the spatial multiplexing scheme, said setting unit changing the level of the modulation scheme and the coding rate before switching and the level of the modulation scheme and the coding rate after switching depending on suitability of communication by the spatial multiplexing scheme determined by said determination unit.

2. The communication apparatus according to claim 1, wherein
   when a determination is made that communication by said spatial multiplexing scheme is suitable, said setting unit performs switching from the communication level by the non-spatial multiplexing scheme to the communication level by the spatial multiplexing scheme, between a first level of the modulation scheme and the coding rate by said non-spatial multiplexing scheme and a second level of the modulation scheme and the coding rate by said spatial multiplexing scheme, and
   when a determination is made that communication by said spatial multiplexing scheme is unsuitable, said setting unit performs switching from the communication level by the non-spatial multiplexing scheme to the communication level by the spatial multiplexing scheme, between a third level of the modulation scheme and the coding rate, which is higher than said first level, by said non-spatial multiplexing scheme and a fourth level of the modulation scheme and the coding rate, which is higher than said second level, by said spatial multiplexing scheme.

3. The communication apparatus according to claim 2, wherein
   said setting unit decreases said communication level as said obtained communication quality is worse, and when a determination is made that communication by said spatial multiplexing scheme is suitable, said setting unit performs switching from the communication level by the spatial multiplexing scheme to the communication level by the non-spatial multiplexing scheme, between said second level of the modulation scheme and the coding rate by said spatial multiplexing scheme and said first level of the modulation scheme and the coding rate by said non-spatial multiplexing scheme, and when a determination is made that communication by said spatial multiplexing scheme is unsuitable, said setting unit performs switching from the communication level by the spatial multiplexing scheme to the communication level by the non-spatial multiplexing scheme, between said fourth level of the modulation scheme and the coding rate by said spatial multiplexing scheme and said third level of the modulation scheme and the coding rate by said non-spatial multiplexing scheme.

4. The communication apparatus according to claim 3, wherein said non-spatial multiplexing scheme is a space-time coding scheme.

5. The communication apparatus according to claim 4, wherein, when a spatial correlation value of reception response vectors of signals through a plurality of antennas of said other communication apparatus is less than a threshold value, said determination unit determines that communication by said spatial multiplexing scheme is more suitable than when the spatial correlation value is more than or equal to said threshold value.

6. The communication apparatus according to claim 4, wherein, when a difference in magnitude between reception response vectors of signals through a plurality of antennas of said other communication apparatus is less than a threshold value, said determination unit determines that communication by said spatial multiplexing scheme is more suitable than when the spatial correlation value is more than or equal to said threshold value.

7. The communication apparatus according to claim 4, wherein, when a number of eigenvalue of a correlation matrix of a propagator matrix composed of reception response vectors of signals through a plurality of antennas of said other communication apparatus is more than or equal to a threshold value, said determination unit determines that communication by said spatial multiplexing scheme is more suitable than when the number of eigenvalues is less than said threshold value.

8. The communication apparatus according to claim 4, comprising a storage unit configured to store information that defines a limiting point of a packet error rate indicating a limit of suitability/unsuitability of the spatial multiplexing scheme, in correspondence with a carrier level to interference and noise ratio, wherein said determination unit reads the limiting point of the packet error rate corresponding to an obtained carrier level to interference and noise ratio based on said information, and when an obtained packet error rate is less than the read limiting point of said packet error rate, determines that communication by the spatial multiplexing scheme is more suitable than when the obtained packet error rate is more than or equal to the read limiting point of said packet error rate.

9. The communication apparatus according to claim 4, wherein
said communication quality management unit receives an identifier indicating preferable multiplicity of a data stream from said other communication apparatus, and
when the preferable multiplicity of said data stream indicated by said received identifier is high, said determination unit determines that communication by said spatial multiplexing scheme is more suitable than when the preferable multiplicity is low.

10. The communication apparatus according to claim 4, wherein said determination unit determines suitability of communication by said spatial multiplexing scheme based on a number of antennas of the other communication apparatus which is the communication partner, a difference in gain between a plurality of antennas and/or past achievements of communication by the spatial multiplexing scheme.

11. The communication apparatus according to claim 4, wherein said determination unit determines suitability of communication by said spatial multiplexing scheme based on an installation location of said apparatus.

12. A communication method for a communication apparatus including a plurality of antennas, comprising the steps of:
obtaining communication quality of a signal received at another communication apparatus which is a communication partner;
determining suitability of communication by a spatial multiplexing scheme to the other communication apparatus which is the communication partner; and
setting to increase a communication level defined by a modulation scheme, a coding rate and a Multi Input Multi Output (MIMO) communication scheme as said obtained communication quality is better, the communication level by a non-spatial multiplexing scheme being lower than the communication level by the spatial multiplexing scheme, and in each MIMO communication scheme, the communication level being higher as a level of the modulation scheme and the coding rate is higher,
when switching the communication level from the non-spatial multiplexing scheme to the spatial multiplexing scheme, said setting step changing the level of the modulation scheme and the coding rate before switching and the level of the modulation scheme and the coding rate after switching depending on suitability of communication by the spatial multiplexing scheme determined by said determining step,
said communication method further comprising the steps of:
modulating a transmission signal according to a set modulation scheme and coding rate;
coding the transmission signal according to the set modulation scheme and coding rate; and
coding a data stream of the transmission signal by the non-spatial multiplexing scheme when a set MIMO communication scheme is the non-spatial multiplexing scheme, and when the set MIMO communication scheme is the spatial multiplexing scheme, subjecting a plurality of data streams of the transmission signal to spatial multiplexing.

* * * * *